H. RICHARDSON.
AUTOMATIC COMPENSATOR FOR WEIGHING MACHINES.
APPLICATION FILED DEC. 15, 1917.

1,346,684.

Patented July 13, 1920.
5 SHEETS—SHEET 1.

Witnesses

Inventor
Henry Richardson,
By
Attorney

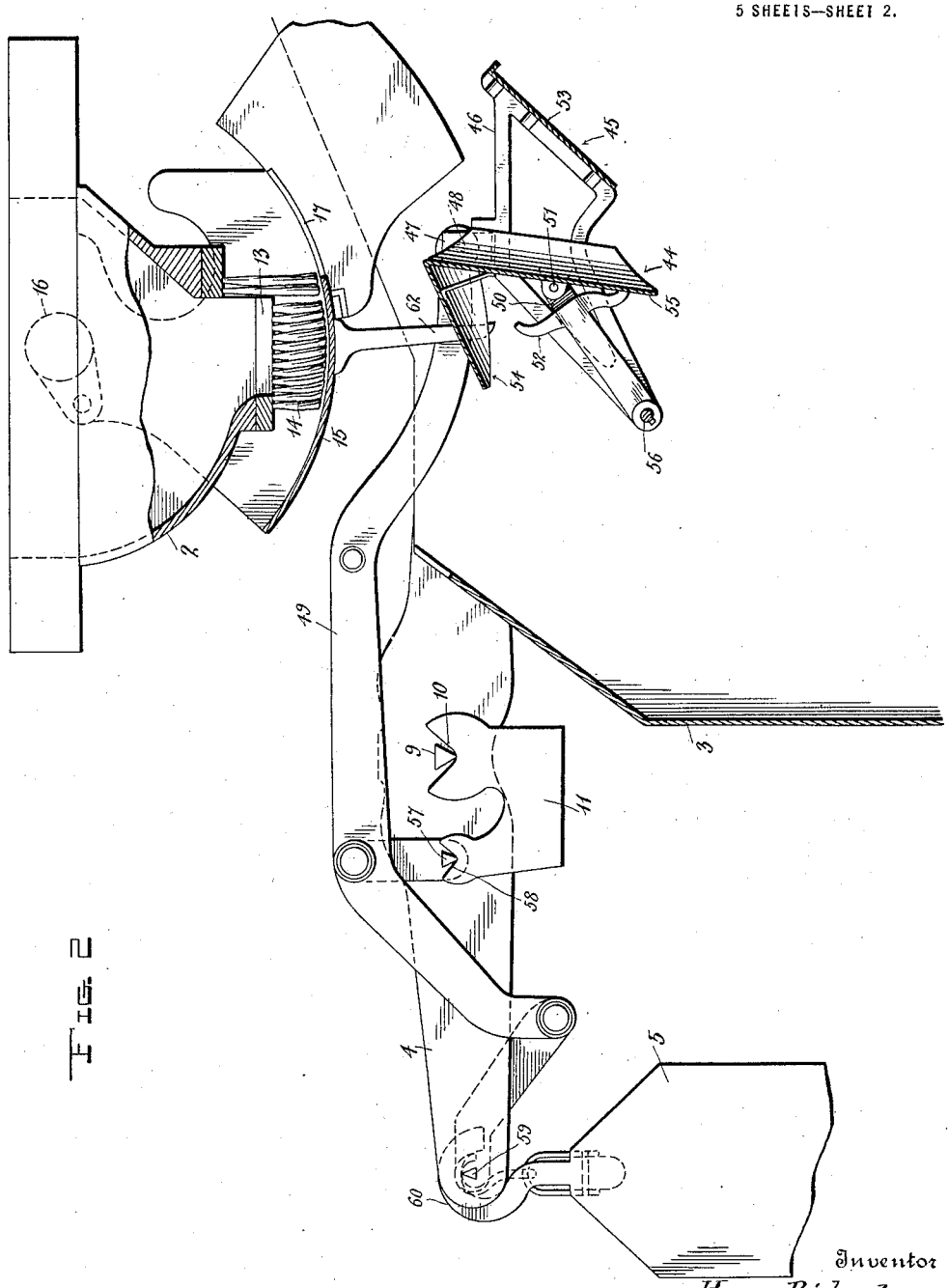

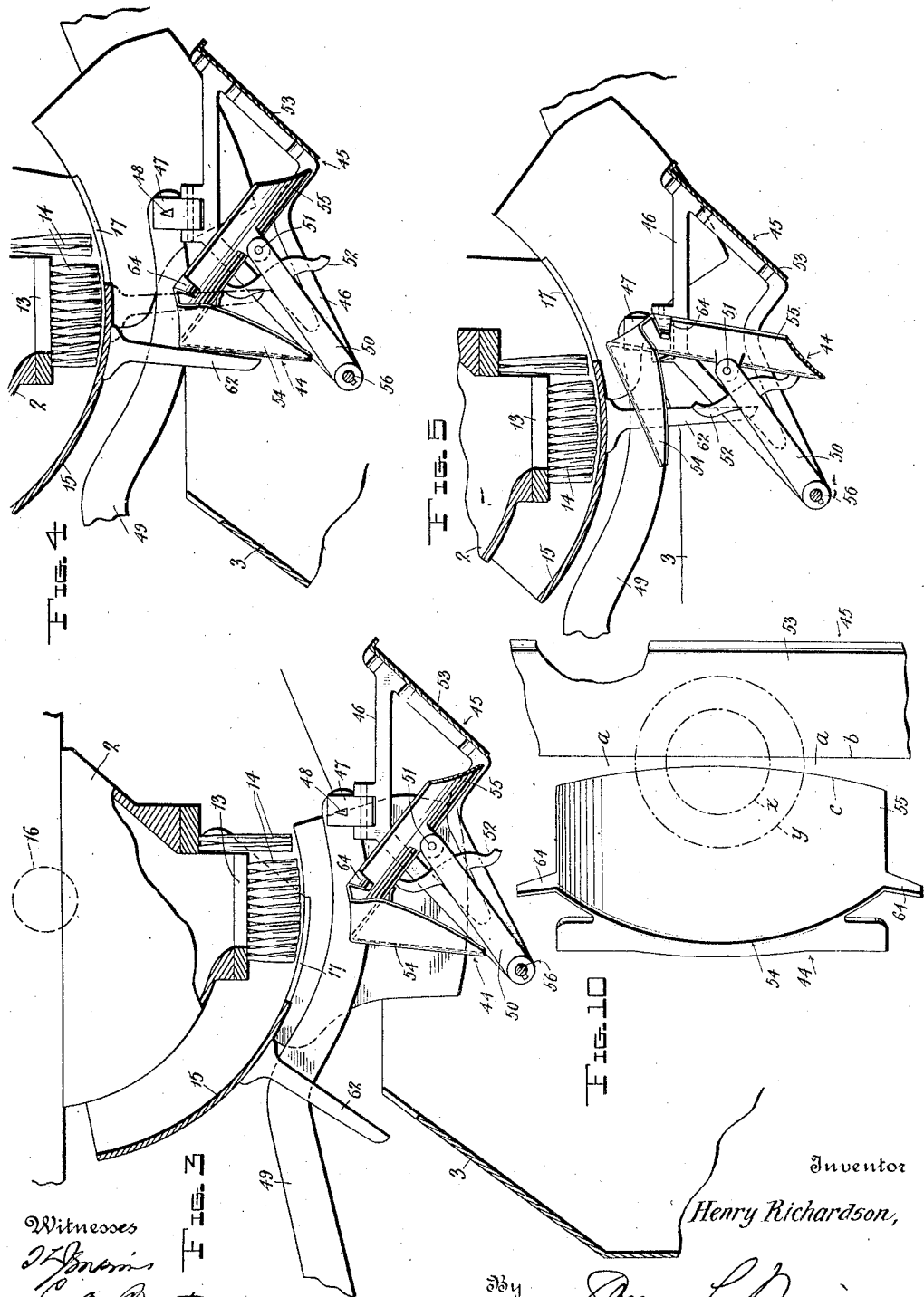

H. RICHARDSON.
AUTOMATIC COMPENSATOR FOR WEIGHING MACHINES.
APPLICATION FILED DEC. 15, 1917.
1,346,684.
Patented July 13, 1920.
5 SHEETS—SHEET 4.
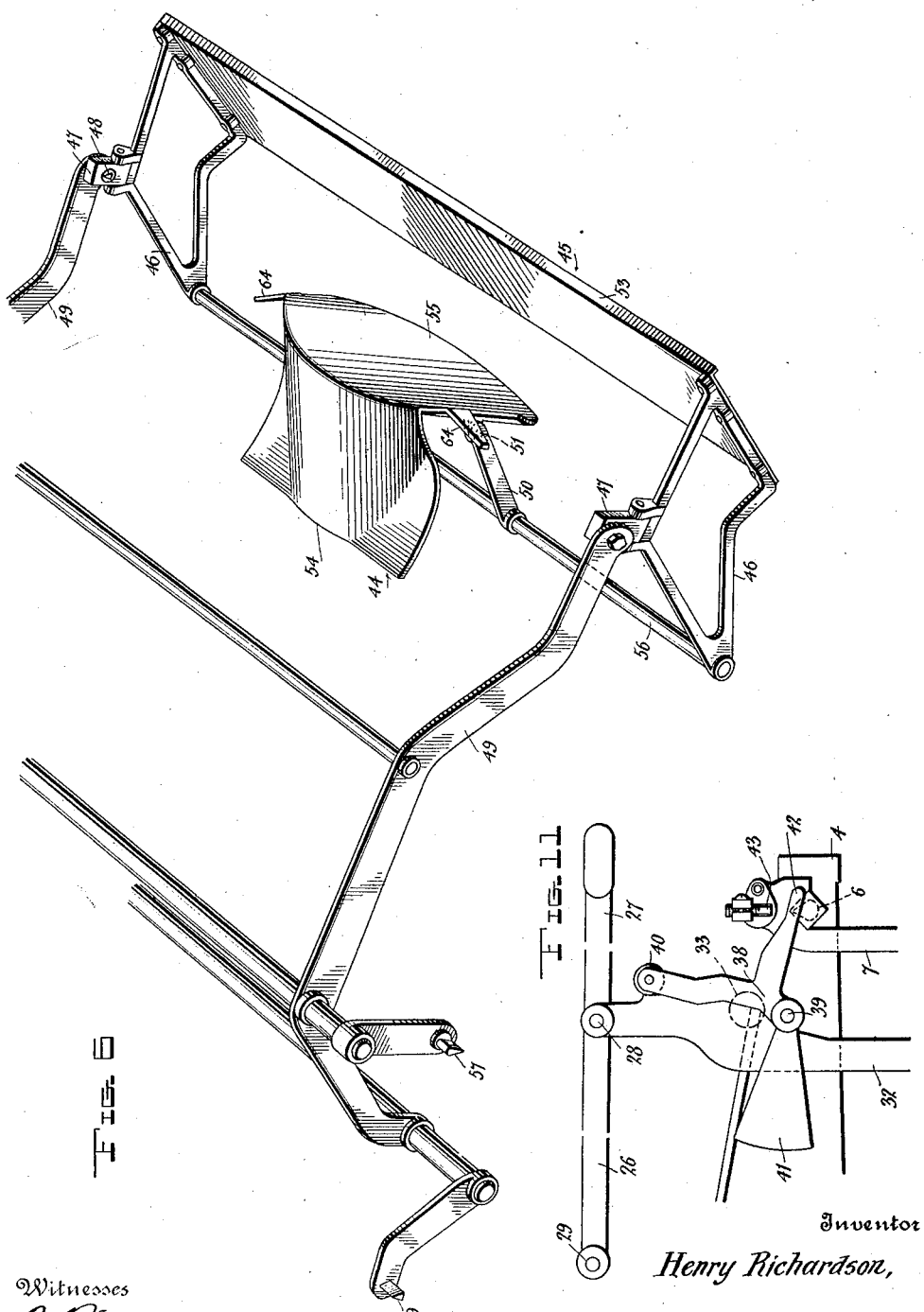
Inventor
Henry Richardson,
Witnesses
By
Attorney H. RICHARDSON.
AUTOMATIC COMPENSATOR FOR WEIGHING MACHINES.
APPLICATION FILED DEC. 15, 1917.
1,346,684.
Patented July 13, 1920.
5 SHEETS—SHEET 5.
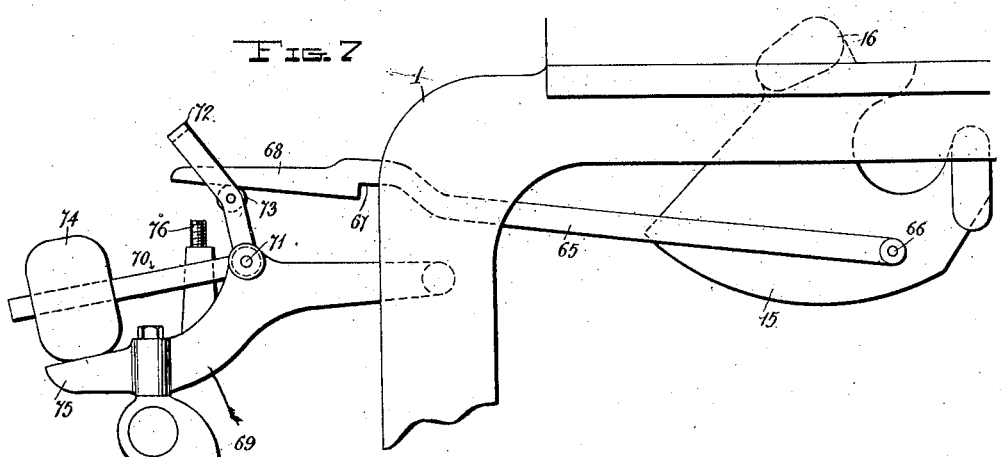
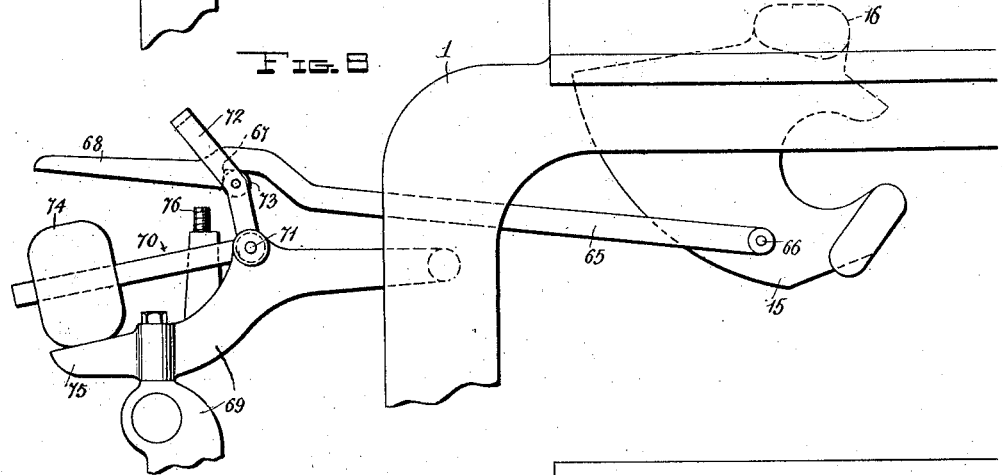
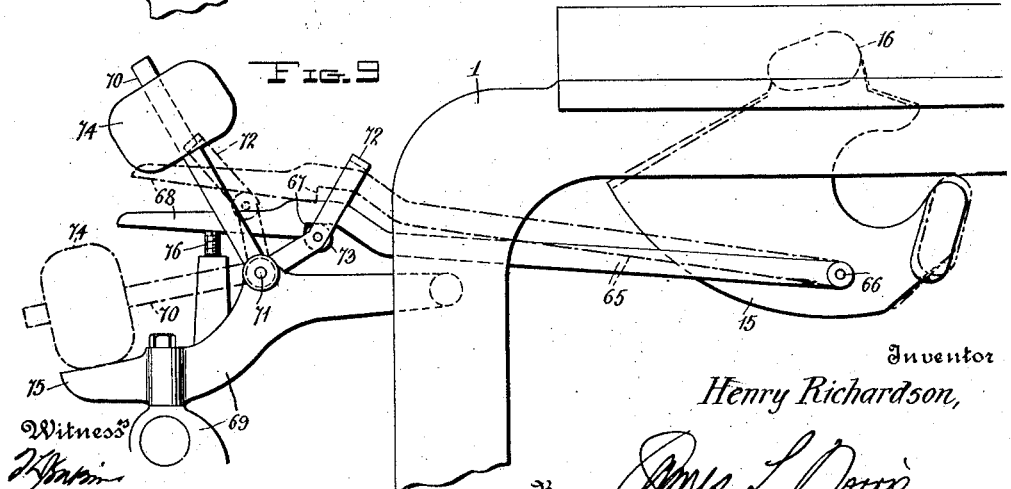
Inventor
Henry Richardson,

UNITED STATES PATENT OFFICE.

HENRY RICHARDSON, OF PASSAIC, NEW JERSEY.

AUTOMATIC COMPENSATOR FOR WEIGHING-MACHINES.

1,346,684.  Specification of Letters Patent.  Patented July 13, 1920.

Application filed December 15, 1917. Serial No. 207,314.

*To all whom it may concern:*

Be it known that I, HENRY RICHARDSON, a subject of the King of Great Britain, residing at Passaic, in the county of Passaic and State of New Jersey, have invented certain new and useful Improvements in Automatic Compensators for Weighing-Machines, of which the following is a specification.

The present invention relates to improvements in weighing machines, and more especially to those of the type wherein the supply of material to the weigh hopper is controlled automatically by the descent of the weigh hopper under the influence of the material introduced therein, and the primary object of the invention is to provide for machines of this class means for compensating for the weight of the suspended column of material in the act of falling into the weigh hopper at the moment the weigh hopper comes to a poise, such compensation being effected accurately and without requiring special adjustments, although materials having different specific gravities are weighed by the machine. The present invention is a further development of and an improvement upon the invention shown, described and claimed in my prior patent, No. 1,006,879, granted October 24, 1911.

Another object of the invention is to provide a relatively simple, easily and accurately adjustable and efficient device for delaying or retarding the closing movement of the supply valve from full flow to dribble stream position, thus prolonging the period of the full flow or loading stream, in consequence of which the speed of operation of the weighing machine may be maintained relatively high without the disadvantage of employing an unduly large dribble stream.

To these and other ends, the invention consists in certain improvements, and combinations and arrangements of parts, all as will be hereinafter more fully described, the novel features being pointed out particularly in the claims at the end of the specification.

In the accompanying drawings: —

Fig. 2 is a detail view of the compensator in conjunction with the weigh hopper and main weigh beam, the supply hopper, and the cut-off valve or shutter therefor.

Figs. 3, 4 and 5 are diagrammatic views showing the relative positions of the compensator, the supply valve or shutter, and the weigh hopper when the supply valve or shutter occupies respectively its full flow, dribble and closed positions.

Fig. 6 is a perspective view of the compensator.

Fig. 7 is a side elevation of the upper portion of the machine showing the device for delaying or retarding the movement of the supply gate from full flow toward dribble stream position, the gate in this figure being closed.

Figs. 8 and 9 are views similar to Fig. 7 showing the relative position of the parts when the supply gate is in its full open position and is approaching its dribble flow position, respectively.

Fig. 10 represents a top plan of the coöperative members of the compensator, showing diagrammatically how the rate of overflow of material at the sides thereof varies in proportion to the size of the stream of material falling thereon.

Fig. 11 is a detail view showing the adjustable stop for tripping the feed gate trigger.

Similar parts are designated by the same reference characters in the several views.

Figure 1:
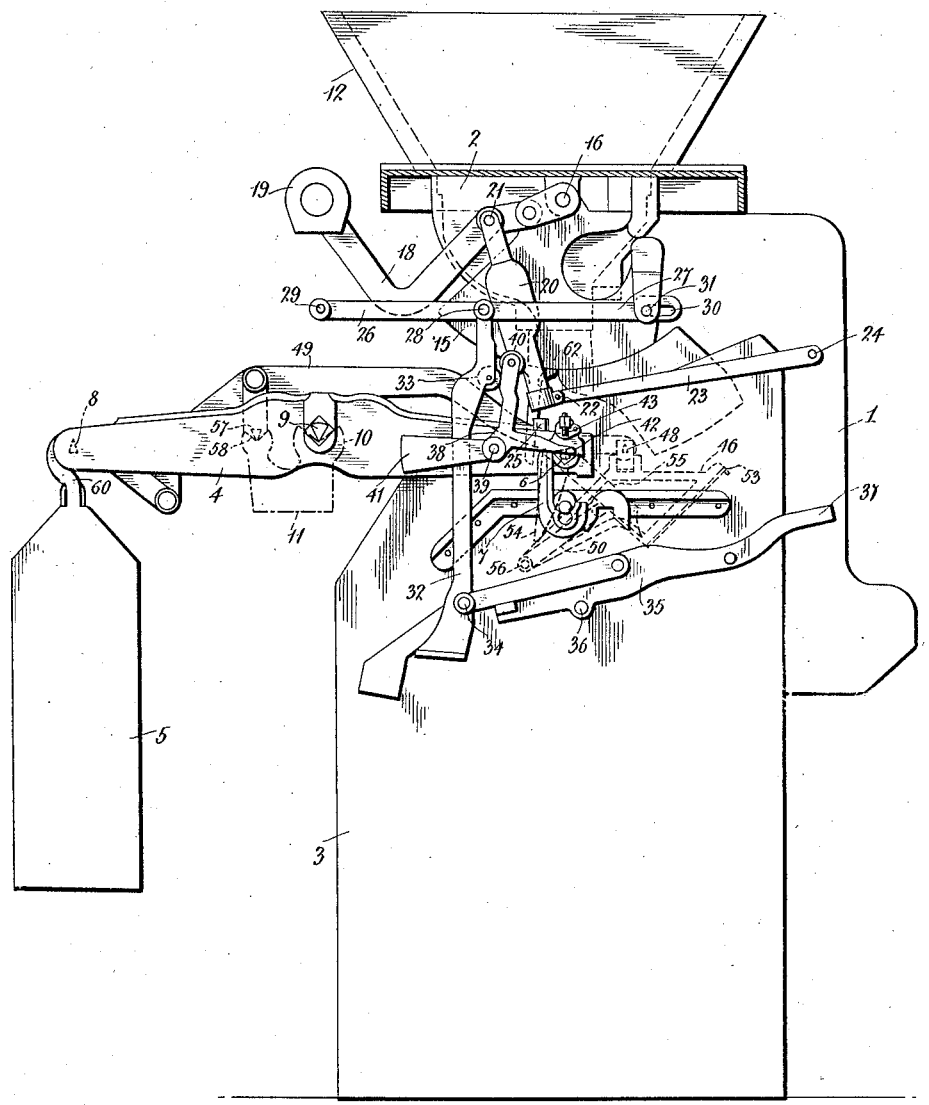
Figure 1 is a side elevation, with part of the frame removed, of an automatic weighing machine embodying a compensator constructed in accordance with the present invention.

Automatic compensating means embodying the present invention is applicable, generally, to weighing machines of the type wherein the supply of material to the weigh hopper is controlled and cut off automatically when the weigh hopper comes to a poise. It is shown in the present instance as applied to an automatic weighing machine of the type shown and described generally in my prior patent, No. 760,485, granted May 24, 1904, but it is to be understood that the invention is not restricted in its application to machines of that particular class. Also, the preferred embodiment of the compensator is shown in the accompanying drawings and will be hereinafter described in detail, but it is to be understood that equivalent constructions are contemplated and will be included within the scope of the claims.

In the present instance, 1 designates a part of the stationary main frame of the machine, 2 designates the feed or supply hopper which is mounted or supported on the main frame, 3 the weigh hopper, 4 one side of the main weigh beam, and 5 the counterweight, the weigh hopper being suspended at each side thereof from a knife edge 6 on one end of the weigh beam through the medium of a link 7 and the counterweight being suspended at each side thereof from a knife edge 8 on the respective side of the main weigh beam 4. Each side of the main weigh beam is supported on the main frame by a knife edge 9 which rests in a bearing 10 formed in a bracket 11, the latter being fixed to the main frame. As is usual in machines of this class, the counterweight is adjusted to balance the weight of the weigh hopper and the weighed charge of the material therein. The material to be weighed is supplied to the machine usually from a chute 12 and the weighed charges of material may be discharged from the bottom of the weigh hopper 3 by a suitable discharge gate or door and controlling mechanism such, for example, as that shown and described in my prior patent, No. 760,485.

The feed or supply hopper 2 has an opening 13 in the bottom thereof through which the material is adapted to flow and to fall in a column into the weigh hopper during the making up of a load therein. The edges of the opening in the supply or feed hopper are preferably surrounded by brushes 14 and the control of the flow of material from the supply or feed hopper is effected by a valve or shutter 15 which is preferably segmental in form, as shown, and is mounted to swing on a pivot 16. This valve or shutter is movable to and from a position beneath the outlet opening in the supply hopper, thus controlling the flow of material therefrom. The brushes 14 coöperate with the shutter when the latter is in closed position to cut off the flow of material from the supply hopper.

In the present instance, the valve or shutter 15 is adapted, when in its fully open position, to permit the maximum flow of material from the supply hopper into the weigh hopper and, when in another or partially closed position, it permits a reduced flow of material from the supply hopper to the weigh hopper. For this purpose, the forward edge of the valve or shutter is formed with a recess 17 which extends partially across the width of the shutter, this recess permitting a reduced flow of material to pass therethrough when the shutter is in its partially closed position. The valve or shutter moves first to its fully open position to permit the bulk or major portion of the load in the weigh hopper to be made up rapidly by a full flow or loading stream, and when the weigh hopper with its load therein approaches a poise the supply valve or shutter moves to its partially closed position, thereby reducing the stream of material entering the weigh hopper to a dribble stream which passes only through the recess 17, and this continues until the weigh hopper comes to a poise, whereupon the supply valve or shutter closes and completely cuts off the supply of material to the weigh hopper. The supply valve or shutter is shown in substantially its fully open position in Fig. 3, in which case the full flow or loading stream will pass from the supply hopper to the weigh hopper. The supply valve or shutter is shown it its partially closed position in Fig. 4, in which case the reduced or dribble stream will flow into the weigh hopper, and Fig. 5 shows the supply valve or shutter in its completely closed position, the valve or shutter moving into this position when the weigh hopper comes to a poise.

The mechanism for actuating the supply valve or shutter is controlled by the movements of the weigh hopper under the influence of the material flowing into the weigh hopper. The general construction and mode of operation of the shutter-controlling mechanism, apart from the compensating means of the present invention, is similar in the present instance to that shown and described in my prior patent, No. 760,485. The shutter 15, as shown, is provided with a crank arm 18 which carries a counterweight 19 which acts to open the shutter, and a pendant 20 is pivotally connected to the fulcrum 21 of the crank arm 18 and has its lower end pivotally connected at 22 to a link 23, the latter being pivotally attached at 24 to a part of the main frame. The main weigh beam 4 has a projection 25 thereon which is located beneath and in alinement with the lower end of the pendant whereby upward movement of the weigh hopper end of the weigh beam (which occurs when the load is discharged from the weigh hopper) will cause upward movement of the pendant and consequent opening of the supply valve or shutter, and the resting of the pendant on the projection 25 will cause the supply valve or shutter to remain in open position until after the weigh hopper end of the weigh beam has descended below a predetermined point. The final closing movement of the supply valve or shutter and the subsequent re-opening thereof are controlled by toggle linkage comprising, in the present instance, a pair of links 26 and 27 which are pivotally connected at 28, the link 26 being pivotally attached to the main frame of the machine at 29 and the link 27 having a longitudinal slot 30 to receive a pin 31 fixed to the supply valve or shutter 15. A pendant link 32 hangs from the middle pivot 28 of the toggle linkage, it having near its upper end a roller 33 and it is pivotally connected at 34 to a lever 35, the latter being pivoted to the main frame at 36 and provided with a vertically movable operating portion 37. A trigger 38 controls the descent of the pendant link 32, this trigger being pivotally mounted on the main frame at 39 and provided with a roller or projection 40 which is arranged to coöperate with the roller 33 of the pendant link 32, and a counterweight 41 on the trigger acts to retain the roller 40 on a dead center with the roller 33. A tripping arm 42 projects from the trigger and is in the path of a projection 43 on the main beam. This projection 43 is preferably adjustable to vary the distance between it and the tripping arm 42 of the trigger, such an adjustment being provided for in the present instance by constructing the projection 43 in the form of a screw. In this way an initial adjustment is provided whereby the distance between the arm 42 and the projection 43, which distance affects the accuracy of the weighing operation, is afforded. For example, if the weighing is heavy, this distance must be reduced, and if the weighing is light this distance should be increased, it being understood that this distance represents the travel of the weigh hopper after receiving its charge to equipoise position. The operation of the shutter-controlling linkage as described is, briefly, as follows:—When the links 26 and 27 are in alinement, as in Fig. 1, the shutter is locked in closed position. This is the case when the weigh hopper has come to a poise with the weighed charge of material therein. When the weighed charge of material is dumped or discharged from the weigh hopper, the operating end 37 of the lever 35 is lowered, thereby causing upward movement of the pendant link 32 which lifts and breaks the locking effect of the toggle links, and the dumping or discharge of the load of material from the weigh hopper also causes the counterweight 5 to elevate the weigh hopper. The rising of the weigh hopper end of the main weigh beam causes the projection 25 thereon to push upwardly against the pendant 20 and the latter operates to swing the shutter into fully open position. The flow of the full or loading stream into the weigh hopper is then initiated and it continues until the load of material in the weigh hopper approaches a poise, the weight of the shutter during this time acting to depress the weigh hopper end of the main weigh beam through the action of the pendant 20 resting on the projection 25. Descent of the weigh hopper as the latter approaches a poise causes partial closing of the shutter, the stream of material entering the hopper being thereby reduced from a full flow or loading stream to a dribble stream. The shutter at this time is supported and held in its partially open position by the trigger 38, the roller 40 of which coöperates with the under side of the roller 33 of the pendant link 32, and this pendant link acts to hold the toggle linkage in its raised or non-locking position. When the proper load of material has been made up in the weigh hopper by the dribble stream, the weigh hopper descends farther, causing tripping of the trigger 38 and dropping of the toggle linkage which effects the final closing of the shutter. The mechanism hereinafter described in detail is generally preferred, but it is to be understood that any equivalent mechanism may be used.

The compensator comprising the present invention serves the function of compensating for the weight of the column or stream of material which is in the act of falling into the weigh hopper at the moment the weigh hopper comes to a poise. It will be understood that, in weighing machines of this class, the supply of material to the weigh hopper is cut off by the supply valve or shutter at the moment when the influence of the material acting to depress the weigh hopper equals the opposing action of the counterweight, but at such moment there is a column of material falling into the weigh hopper which material is added to the weighed charge, thus producing an overcharge in the hopper equal substantially to the weight of material in the falling column or stream. The present invention provides means which compensates automatically for this falling column or stream of material, and the compensating means provided operates accurately without requiring special adjustments in the weighing of materials of different specific gravities. Preferably, and as shown, the compensating means of the present invention comprises a pair of cooperative pivotally connected members 44 and 45 which are suspended within the weigh hopper and in the path of the column of material falling therein, and the influence of the falling column of material upon these members is transmitted to the main weigh beam with an increased leverage or mechanical advantage over the influence of the weigh hopper on the main weigh beam. Preferably, and as shown, the member 45 comprises a pair of brackets 46, each having a bearing 47 to coöperate with a knife edge 48 on one end of a compensating beam 49, and each bracket 46 supports a plate 53 which extends transversely within the upper portion of the weigh hopper and is fixed at its ends to the respective brackets 46. The member 44 is preferably of less width than the plate 53 and it comprises a pair of wings 54 and 55 which are arranged in angular relation and are rigidly connected to one another. The middle portion of the wing 54 is preferably convex on its upper side and the edges thereof are dished, as shown, while the upper side of the wing 55 is preferably concave. The member 44 is supported on the brackets 46 of the member 45 by a pair of rods 56 which extend inwardly from the respective brackets 46 and are provided with upwardly projecting arms 50 which coöperate with a pair of pivots 51 on the wing 55. The member 44 comprising the rigidly connected wings 54 and 55 is adapted to occupy alternately the positions shown in Figs. 3 and 5, its rocking movements in each direction about the pivots 51 as an axis being limited by the two-armed stop 52 which is fixed to one of the arms 50 and coöperates with the under side of the wing 55. A secondary or compensating beam 49 is used, this compensating beam comprising a pair of rigidly connected side members arranged toward opposite sides of the weigh hopper, and each side member of the compensating beam is provided with a knife edge 57 which coöperates with a bearing 58 formed in the bracket 11, the rear end of each member of the compensating beam having a knife edge 59 which coöperates with a flexible shackle 60 which is attached to the counterweight. The distance between the knife edges 48 and 57 of the compensating beam is greater than the distance between the knife edges 6 and 9 of the main weigh beam, and hence the influence of the falling column of material acting upon the members 44 and 45 will operate to lift the counterweight with an increased leverage as compared with the influence of the falling column of material acting upon the weigh hopper. Owing to the difference in the locations of the fulcrums of the main weigh beam and the secondary or compensating beam, there will be a slight difference in the radii of the arcs in which the knife edges 8 and 59 swing, but this difference is provided for by the flexible shackles 60 which connect the compensating beam to the counterweight, thus avoiding any inaccuracy in the weighing operation from such source.

The pivotal center 56 on which the member 44 is adapted to rock is located below the center of weight of such member whereby, when this member is brought to a position where its center of weight is at either side of the vertical plane of the pivotal center, the top heaviness thereof will cause it to swing into one of the two positions shown in Figs. 3 and 5. The member 44 is swung automatically into the position shown in Fig. 3, from the position shown in Fig. 5, by the impact of the falling column of material acting on the upper side of the wing 54, and it is swung from that position to the position shown in Fig. 5 by an arm 62 fixed to one or both sides of the shutter 15 which strikes a projection 64 on the member 44 when the shutter moves from the dribble stream position to its fully closed position, this movement of the member 44 dumping the material which accumulates between it and the coöperating member 45 into the weigh hopper.

During the weighing operation, the compensating members 44 and 45 occupy substantially the position and relation shown in Figs. 3 and 4, in both of which positions these members are in the path of the column or stream of material falling from the supply hopper into the weigh hopper, and the material accumulates in the pocket formed between them and overflows therefrom into the weigh hopper. The weight of the accumulated material and the impact produced by the falling column of material act on the compensating members with a force tending to raise the counterweight and to lower the weigh hopper, and this force acts with a greater mechanical advantage than if it acted on the weigh hopper, owing to the greater leverage of the compensating members as compared with the weigh hopper. In consequence, the shutter will close to cut off the dribble stream at the moment the influence of the material accumulated between the compensating members and the impact of the falling material acting thereon, added to the weight of the weigh hopper and the bulk of the load of material, are able to poise the counterweight. Closing of the shutter dumps the accumulated material on the compensating members into the weigh hopper as part of the load therein, and after discharge of the load from the weigh hopper, the compensator is restored automatically to the position shown in Fig. 3 by the falling stream of material upon reopening of the shutter at the commencement of the next subsequent weighing operation.

Compensation for the weight of the column or stream of material in the act of falling at the moment the weigh hopper comes to a poise is accomplished by the present invention, irrespective of the specific gravity of the material being weighed, and it is accomplished automatically without requiring a special adjustment for each kind of material that may be handled. Also, the compensator is self-cleaning of material at the completion of each weighing operation and requires no manual manipulation by an attendant. The present embodiment of the invention also has the advantage that the quantity of material accumulated on the compensator is dumped into the weigh hopper to form a part of the weighed charge therein, upon the completion of the respective weighing operation.

According to the present invention, accuracy in the weighing of all charges is attained, irrespective of any variations that may occur in the rate of flow of the material into the weigh hopper during different weighing operations, due to variations in the supply or sluggishness in the flowing qualities of the material.

The present invention also provides means for maintaining the speed of operation of the machine, yet allowing the use of a dribble stream which is not too large for accuracy but is sufficiently large to insure a certain and free flow of the material and the usual amount of rubbish contained therein. The function of this device is to arrest or retard the closing movement of the supply gate from the full flow to the dribble stream position, thus prolonging the full flow period sufficiently to reduce the time necessary to make up the charge or load in the weigh hopper.

This device, as shown in Figs. 7, 8 and 9, comprises a link 65 one end of which is pivotally connected at 66 to the supply gate 15 and the opposite end of which is provided with a shoulder or notch 67 and an arm 68 extending rearwardly therefrom. A bracket 69 is fixed to one of the sides of the main frame of the machine and has a bell-crank 70 pivoted thereto at 71. The bell-crank has an upwardly projecting arm 72 provided with a roller 73 arranged to coöperate with the shoulder 67 the under side of the arm 68, and a weight 74 on the other arm of the bell-crank acts to rock the arm 72 thereof rearwardly. The weight is adapted to rest upon the stop 75 when in its lower position, and a set screw or other suitable adjustable stop 76 is provided to coöperate with the arm 68 and thereby limit its downward movement.

When the supply gate 15 is in its closed position, the arm 68 of the link rests on the roller 73 of the bell-crank, the weight 74 being then in its lower position, as shown in Fig. 7. Opening of the supply gate causes rearward movement of the attached link 65 to a degree sufficient to carry the shoulder or notch 67 thereof past the roller 73, the shoulder being thereby caused to engage behind the roller 72 by the weight of the link. As the gate closes, the link 65 is pulled forwardly, causing the weight 74 of the bell-crank to be lifted and, in consequence, the weight offers a resistance to the closing movement of the gate from the full flow position to the dribble position. At a predetermined and permanently adjusted point in the forward movement of the link 65, the arm 68 thereon comes down upon the stop 76, owing to the rocking of this end of the link about the pivot 71 as a center, and continued forward movement of the link incident to the movement of the supply gate toward dribble position causes the roller 73 to disengage from the shoulder or notch 67, the gate being then free to assume its dribble position without interference by the weight. Upon such release of the bell-crank the weight 74 thereon drops upon the stop 75. The retarding influence of the device extends over only a portion of the closing movement of the gate, but it is sufficient to materially retard its movement during the full flow period, thus increasing the amount of material fed to the weigh hopper during the full flow period.

From the diagram shown in Fig. 10 it will be understood that the base of the pyramid of material retained on the coöperative members of the compensator will vary in diameter in proportion to the size of the falling column or stream of material and that the amount of material overflowing from the compensator will increase or diminish or decrease as the diameter of the base of the pyramid of material increases or diminishes, owing to the tapered form of the overflow gaps $a$ between the surface $b$ of the compensator member 55 and the curved edge $c$ of the compensator member 54. For example, with a relatively small pyramid of material $x$, the gaps $a$ through which the material overflows will be relatively small, while with a relatively larger pyramid $y$ these overflow gaps present larger openings through which the material escapes. It will also be understood that the height of the pyramid of material retained on the compensator and, in consequence, the amount of such material, will increase or decrease according to an increase or a decrease in the size of the falling stream. Hence, compensation is made automatically for any variation in the rate of feed of the material to the weighing machine.

I claim as my invention:—

1. In a weighing machine having a weigh hopper and beam, and a supply hopper above the weigh hopper having means for controlling the feed of material to the weigh hopper, a compensator for controlling the operation of said feed controlling means, said compensator being adapted and arranged to receive and retain thereon a quantity of the material fed to the weigh hopper, means for causing the influence of the material on the compensator to act as a force tending to cause closing of the feed controlling means, and means for dumping the retained material from the compensator into the weigh hopper when the feed thereto is cut off.

2. In a weighing machine having a weigh hopper and beam, a supply hopper above the weigh hopper for feeding material thereto, and means for controlling the flow of material to the weigh hopper, a compensator located in the weigh hopper and in the path of the column of material flowing from the supply hopper to the weigh hopper to receive and retain a volume of the material thereon, means for causing the weight of material retained on the compensator to act on the weigh beam, and means for dumping the retained material from the compensator into the weigh hopper to make up a part of the weighed charge therein.

3. In a weighing machine having a weigh hopper and beam, and a supply hopper above the weigh hopper having valve means for controlling the flow of material thereto, a compensator adapted and arranged to receive and retain thereon material flowing into the weigh hopper, means for causing the influence of the material on the compensator to act as a force tending to cause closing of said valve means, and means for automatically dumping the retained material from the compensator into the weigh hopper to make up a part of the charge therein upon completion of the weighing thereof.

4. In a weighing machine of the class embodying a weigh hopper and beam, and a supply hopper above the weigh hopper and having valve means governed by the weigh beam for controlling the flow of material into the weigh hopper, a compensator adapted and arranged to receive and retain thereon a quantity of the material flowing from the supply hopper to the weigh hopper, means for transmitting the influence of the material on the compensator to the weigh beam, and means for dumping the retained material from the compensator into the weigh hopper upon the cutting off of the flow of material to the weigh hopper.

5. In a weighing machine of the class having a weigh hopper and beam, and a supply hopper having means governed by the movement of the weigh beam for controlling the flow of material to the weigh hopper, a compensator adapted and arranged to receive and retain thereon a quantity of the material flowing to the weigh hopper, means for transmitting the influence of the material on the compensator to the weigh beam at a greater mechanical advantage than the action of the weigh hopper thereon, and means for dumping the retained material from the compensator into the weigh hopper to form part of the weighed charge therein.

6. In a weighing machine of the class having a weigh hopper and beam, and a supply hopper above the weigh hopper and having means governed by the movements of the weigh beam for controlling the flow of material to the weigh hopper, a compensating device adapted and arranged to receive and retain thereon a quantity of the material flowing to the weigh hopper, a compensating beam acted on by the compensating device and acting on the weigh beam with a greater leverage than that of the weigh beam, and means for dumping the retained material from the compensating device into the weigh hopper to form part of the weighed charge therein.

7. In a weighing machine of the class having a weigh hopper and beam, and a supply hopper having means governed by the weigh beam for controlling the flow of material to the weigh hopper, a compensator adapted and arranged to receive and retain thereon a quantity of the material flowing to the weigh hopper and acting on the weigh beam in accordance with the influence of the material on the compensator, the compensator being operative by said supply controlling means in closing to discharge the material retained thereon into the weigh hopper.

8. In a weighing machine of the class having a weigh hopper and beam, and a supply hopper having means governed by the weigh beam for controlling the flow of material to the weigh hopper, a compensator for the column of material in suspension at the moment of closing of the supply controlling means comprising movably related members operatively connected to the weigh beam and located in the path of the material flowing to the weigh hopper, said members being operative during the flow of material to form between them a pocket to receive and retain a quantity of such material, and relatively movable upon the cutting off of such flow to discharge such retained material into the weigh hopper.

9. In a weighing machine of the class described, a compensator for the column of material in suspension at the moment of cut-off of the flow thereof to the weigh beam comprising a pair of suspended pivotally related members operatively connected to the weigh beam and arranged in the path of the material flowing to the weigh hopper, said members being operative during the flow of material to the weigh hopper to receive and retain thereon a quantity of such material, and relatively movable at the moment of cut-off of such flow to discharge such retained material into the weighed charge in the weigh hopper.

10. In a weighing machine of the class embodying a weigh hopper and beam, and a supply hopper having a shutter governed by the weigh beam for controlling the flow of material to the weigh hopper, a compensator for the column of material in suspension at the moment of closing of said shutter, said compensator comprising a pair of pivotally connected members arranged in the path of flow of material to the weigh hopper and operative during such flow to receive and retain a quantity of such material, a compensating beam arranged to act on the weigh beam and from which the compensating members are suspended, and means operative by said shutter in closing to relatively move said compensator members to discharge the material retained thereby into the weigh hopper.

11. In a weighing machine of the class described, a compensator for the column of material in suspension at the moment of cut-off of flow thereof to the weigh hopper, said compensator comprising a pair of members arranged in the path of flow of the material to the weigh hopper, one of said members being pivoted on an axis below its center of weight whereby it will tend to swing into either of two positions, said members coöperating when the pivoted member is in one of said positions and during the flow of material to the weigh hopper to receive and retain thereon a quantity of such material, and the pivoted member being movable, upon the cut-off of such flow, to an opposite position to discharge such retained material into the weigh hopper.

12. In a weighing machine of the class described, a compensator for the column of material in suspension at the moment of cut-off of the flow of material to the weigh hopper comprising movably related sections located in the path of such flow, one of said members being movable under the influence of the flowing material into coöperation with the other member whereby said members will receive and retain a quantity of such material, and also movable into another position when such flow is cut off to discharge such retained material into the weigh hopper.

13. In a weighing machine having a weigh hopper and beam, and a supply hopper having valve means for controlling the flow of material into the weigh hopper, a compensator arranged to receive and retain thereon material flowing from the supply hopper into the weigh hopper, means for causing the influence of such material on the compensator to act as a force tending to depress the weigh hopper, and means for automatically dumping the retained material from the compensator upon cutting off of the flow of material to the weigh hopper.

14. In a weighing machine having a weigh hopper and beam, and a supply hopper having valve means governed by the weigh beam for controlling the flow of material into the weigh hopper, a compensator arranged to receive and retain thereon a quantity of material flowing from the supply hopper to the weigh hopper, means for transmitting the influence of the material on the compensator to the weigh beam, and means for automatically dumping the retained material from the compensator upon closing of said valve means.

15. In a weighing machine of the class having a weigh hopper and beam, and a supply hopper having means governed by the weigh beam for controlling the flow of material to the weigh hopper, a compensator for the material falling into the weigh hopper at the moment of cut-off of the flow of material thereto comprising movably related members arranged to exert a depressing effect on the weigh beam and operative during the flow of material to form between them a pocket to receive and retain a quantity of material, and relatively movable upon the cutting off of such flow to discharge the retained material therefrom.

16. In a weighing machine of the class described, a compensator for the column of material in suspension at the moment of cut-off of the flow of material to the weigh hopper comprising relatively movable members located in the path of a column of material flowing into the weigh hopper, said members being adapted in one relative position to retain thereon a quantity of such material and adapted when in another relative position to discharge such retained material.

17. In a weighing machine of the type having a weigh hopper and a feed gate controlling the flow of material thereto, means to compensate for the column of material falling into the weight hopper comprising members coöperative to receive and retain thereon in the form of a pyramid a quantity of the falling column of material and forming between them openings at the base of such pyramid through which the material may overflow at a rate which increases as the diameter of the base of the pyramid increases.

18. In a weighing machine of the type having a weigh hopper and a feed gate controlling the flow of material thereto, means to compensate for the column of material falling into the weigh hopper at the moment of closing of said gate comprising a pair of relatively movable members coöperative in one position to retain thereon a quantity of the falling material in the form substantially of a pyramid and providing outwardly tapering gaps for the escape of such material, said members when relatively moved from said position dumping the retained material therefrom.

19. In a weighing machine of the type having a weigh hopper, a feed gate for controlling the flow of material to the weigh hopper, a mechanical means for controlling the closing of said gate during movement of the weigh hopper toward equipoise position, and a member operative by such movement of the weigh hopper to mechanically actuate said gate controlling means, said member being adjustable to vary the range of movement of the weigh hopper before said member causes actuation of said gate controlling means.

20. In a weighing machine of the type having a weigh hopper, a feed gate for controlling the flow of material to the weigh hopper, the combination of means including a trigger for causing automatic closing of said gate during movement of the weigh hopper toward equipoise position, and a stop member operative by said movement of the weigh hopper to mechanically trip said trigger and thereby cause closing of the gate, said stop member being adjustable to vary the distance through which the weigh hopper moves toward equipoise position before said trigger is tripped.

In testimony whereof I have hereunto set my hand in presence of two subscribing witnesses.

HENRY RICHARDSON.

Witnesses:
S. G. MURRAY,
E. F. WHITE.